April 16, 1957  P. MIDDELER  2,788,582
APPARATUS FOR MEASURING AND GAUGING CYLINDRICAL AND
CONICAL BORES AND INTERNAL SCREW THREADS
Filed March 31, 1953  2 Sheets-Sheet 1
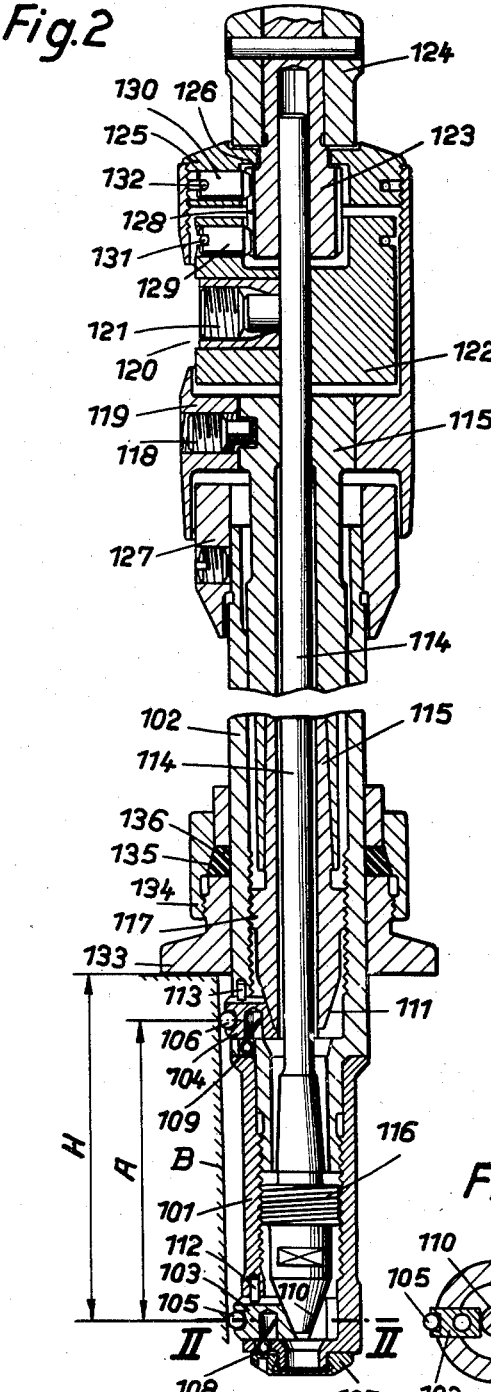
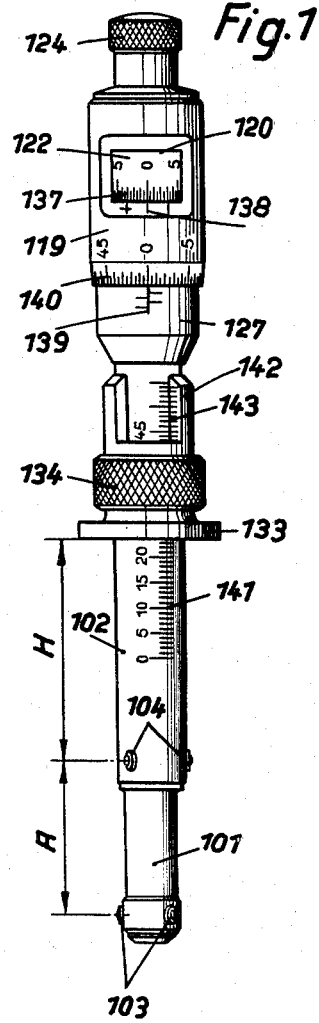
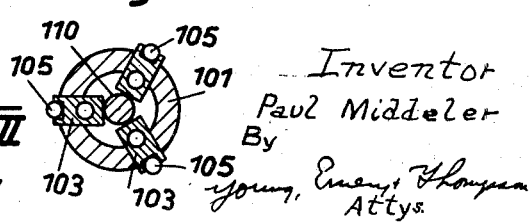
Inventor
Paul Middeler
By
Young, Emery, Thompson
Attys.

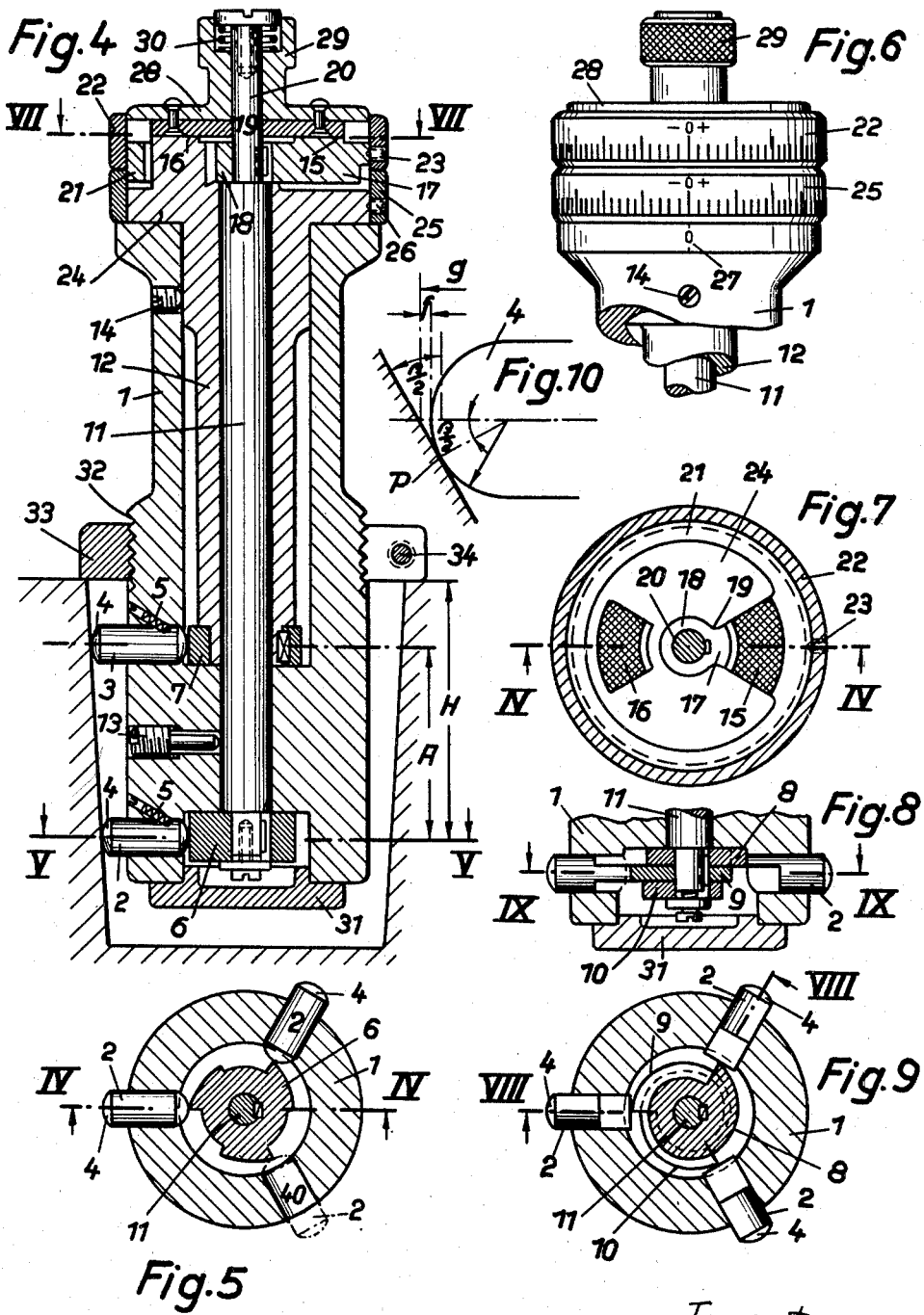

United States Patent Office 2,788,582
Patented Apr. 16, 1957

2,788,582

APPARATUS FOR MEASURING AND GAUGING CYLINDRICAL AND CONICAL BORES AND INTERNAL SCREW THREADS

Paul Middeler, Stuttgart-Degerloch, Germany

Application March 31, 1953, Serial No. 345,942

8 Claims. (Cl. 33—174)

The gauging of conical bores, for example sockets for Morse drills, is conventionally effected by means of conical gauges, the depth of penetration of which gives a basis for the diameter tolerances. The taper and roundness of the bore are examined by rubbing markings on the gauge. The gauging obtained in this way was only of general character and enabled individual defects to be estimated only in the case of relatively small departures.

To obtain satisfactory gauging of a conical bore three entirely distinct measurements must be performed, that is:

1. A measurement of the roundness of the bore at a number of places of different diameter,
2. A measurement of the taper or conicity of the bore, which is the difference in diameter taken at two axially spaced transverse planes, divided by the axial distance between said planes, and
3. A measurement of the diameter at a determined axial distance from the face of the bore.

The measuring apparatus of the present invention can perform these three measuring operations, and therefore satisfy the gauging requirements for both conical and cylindrical bores, without assistance from any auxiliary measuring equipment, and it is characterized by comprising a casing, at least two groups of contactors mounted capable of radial movement in said casing with a predetermined axial distance between the two groups, each of said groups having its contactors arranged in a common plane of measurement, and actuator means in said casing and engaging the contactors of the two groups to control their radial movement.

The actuator means for the contactors may consist of conical members or cam discs on operating shafts, the angle of rotations of which are proportional to the radial travel of the contactors and can be read on suitable scales. The said shafts are preferably concentrically arranged and have their outer ends operable through a friction drive common thereto in such a manner that an equal torque is imparted to each shaft, and the arrest of one shaft owing to its associated contactors coming into contact with the wall of the bore, does not prevent further rotation of the other shaft until its associated contactors also come into contact with the bore wall.

Embodiments of the invention are illustrated in the drawing and will now be described in detail, and in which:

Fig. 1 is an elevation of a measuring apparatus according to the invention,

Fig. 2 is an axial cross-section of Fig. 1, on a larger scale,

Fig. 3 is a transverse section of Fig. 2 taken on line II—II,

Fig. 4 is an axial cross-sectional elevation of a second constructional example, Fig. 5 is a cross-section of Fig. 4 taken on line V—V, Fig. 6 is an elevation of the operating head of the apparatus, Fig. 7 is a cross-section of Fig. 4 taken on line VII—VII, Fig. 8 is a section taken on line VIII—VIII of Fig. 9, Fig. 9 is a section taken on line IX—IX of Fig. 8, and Fig. 10 is a diagrammatic showing on a greatly enlarged scale, of the region of contact of a contactor with the wall of a conical bore.

The measuring device of Figs. 1–3 has a casing consisting of two sleeves 101, 102 screwed together, which sleeves have radial openings in which are mounted radially slidable contactors 103, 104 having spherical contact or feeler means for measuring bores, said means in the present example being balls 105, 106 inserted in the ends of the contactors but may consist of spherical surfaces integral therewith. In the case of measuring internal threads, the feeler means may be in the form of knife edges. At its end the casing sleeve 101 is closed by a screw-on cap 107. The contactors 103, 104 are urged by springs 108, 109 against conical actuating members 110, 111 arranged in the casing 101, 102 and are prevented from turning by means of pins 112 and 113 engaging longitudinal slots. The measuring planes of the groups of contactors are spaced from each other by a fixed axial distance A, Figs. 1, 2 and 4, which in the measurement of internal screw threads is a multiple of the thread pitch.

The conical actuating members 110, 111 form the ends of shafts 114 and 115. The shaft 115 for the measuring contactors 104 is a hollow shaft consisting preferably of two parts firmly screwed together, and surrounding the shaft 114. The shaft 114 has a screw threaded portion 116 behind the cone 112 and threaded in the casing sleeve 101, and the shaft 115 has a screw-threaded portion 117 threaded in the casing sleeve 102.

Behind the rear end of the casing sleeve 102 a sleeve 119 having a window 120 therein is fixed on the hollow shaft 115 by means of a screw 118, and on the internal shaft 114 there is fixed by means of a screw 121, a ring 122 arranged below the opening 120. Above the rear end of the shaft 114 is inserted a bushing 123 in which said shaft is free to turn and slide. The bushing 123 carries a knob 124 and also forms the rear bearing of the sleeve 119 which has an annular closure disc 125 and is held with freedom to turn on the bushing 123 but is prevented from axial movement relatively thereto, by engaging between a collar 126 on said bushing and the front face of the knob 124. At its front end the sleeve 119 engages over a sleeve 127 fast on the rear casing sleeve 102. The part of the bushing 123 inside the sleeve 119 is provided with stop teeth or projections 128 engaging spring pressed stop members 129, 130 which are slidable outwardly against the force of annular springs 131 and 132, some of which stop members are in a part of the ring 122 engaging over the bushing 123, and others are in the disc 125 fast on the sleeve 119. This provides a coupling between the bushing 123 or the knob 124 and the two shafts 114 and 115 permitting the transmission of a predetermined equal torque to each of the shafts.

When the knob 124 is turned, with the casing 101, 102 held stationary both the shafts 114 and 115 are turned. The shaft 114, according to the direction of rotation of the knob, is moved by its screw threaded part 116 forwardly or rearwardly in the front casing sleeve 101. The conical end 110 of this shaft produces a radial inward or outward movement of the front measuring contactors 103. Similarly the hollow shaft 115 has screw engagement with the inner casing sleeve 102 and moves the rear measuring contactors 104 radially inwards or outwards. The pitch of the screw threads 116 and 117 of the shafts 114, 115 and the conicity of their ends 110 and 111 acting on the contactors 103 and 104 are equal, therefore the radial movements of the front and rear measuring contactors resulting from turning the knob 124 are equal. The bushing 123 accompanies the sleeve 119 in its axial movement since both these parts are held by the disc 125 so that they cannot move axially with respect to each other.

If one of the two shafts 114 or 115, owing to contact of one of the measuring contactors 103 or 104 actuated thereby, against the workpiece, has its further turning obstructed, the maximum torque produced by its coupling with the stop tooth 128 is exceeded and its stop members 129, 130 click idly and resiliently over the teeth 128. The arrested shaft remains stationary. The other shaft is carried round by the turning bushing 123 until its actuated measuring contactors reach the contact position. Then, on further turning of the bushing 123 the stop members 129, 130 of both shafts 114, 115 click over the teeth 128 and both shafts cease to turn. Since the torque at which disconnection takes place is equal for both shafts, the contact pressure of the contactors 103, 104 is always equal in the two planes of measurement.

On the rear fixed casing sleeve 102 a stop ring 133 is arranged between the rear measuring pellet and the sleeve 127. This stop ring is axially inserted on the casing sleeve 102 and can be fixed thereon by means of a threaded ring 134 having an internal conical surface 135 co-operating with a pressure ring 136 located in a seating in the stop ring 133 and bearing against the casing sleeve 102. The stop ring 133 in measuring bears in the manner shown in Fig. 2 on the face of the bore B to be measured. Its position on the casing sleeve 102 determines the distance H of the measuring contactors 103 or 104 from the end of the bore being measured or inspected.

On the ring 122 connected to the inner shaft 114 there is provided a scale 137 which co-operates with an edge of the window 120, bearing an index mark 138, on the sleeve 119 connected to the shaft 115. The front end of the sleeve 119 co-operates with a longitudinal scale 139 on the sleeve 127 fixed to the casing sleeve 102 and gives on this scale the axial displacement of the shaft 115 or the position of the measuring contactors 104. A scale 140 engraved on the edge of the sleeve 119 serves to give a fine reading of the position of the sleeve 119. Finally there is provided on the casing sleeve 102 a longitudinal scale 141 by means of which the distance H of the stop ring 113 from one of the measuring planes can be adjusted. For fine adjustment a vernier scale is arranged on a projection 142 of the stop ring 133.

The apparatus is calibrated on a standard cone. The departure from zero position of the scale 137 from the index mark 138 shows the departure of conicity of the measured bore from the standard measurement when the two groups of measuring contactors are brought into contact with the wall of the bore in the above described manner. The diameter of the bore in the plane of the rear contactors can be read on the scales 139 and 140. The device thus can be used also to measure the diameter of cylindrical bores. Also the roundness of a bore can be determined by measuring its diameter by means of the scales 139 and 140 at a plurality of places at different angles around the bore. By shifting the stop ring 133 and thus changing the distance H the depth of penetration of the apparatus in the bore can be varied, and thus a large range of measurement obtained.

By holding the sleeve 119 stationary and turning the knob 124 or vice versa, both groups of measuring contactors can be separately adjusted.

In the embodiment shown in Figs. 4–9 the apparatus has a cylindrical casing 1 with a lower enlargement carrying two groups of measuring contactors 2, 3 which are shown as solid cylindrical pellets with rounded contact surfaces, the groups being spaced by a fixed distance A. The contactors of each group are in a common measuring plane and are guided in radial bores 40 as shown in Fig. 5. Their contact surfaces 4 are spherical for measuring bores, and of knife-edge form for measuring internal screw threads. In the case of measuring screw threads the distance A between the planes of measurement is a multiple of the thread pitch. Each contactor 2, 3 is urged by a spring 5 lodged in the casing 1 to hold its inner end against an actuator in the form of a cam disc 6 which controls the radial displacement of the contactors. In the example shown in Figs. 4 and 5 there is provided only one cam disc 6 or 7 for each group of contactors, while in the example shown in Figs. 8 and 9 there is provided one cam disc 8, 9, 10 for each contactor of a group, whereby with equal rotation of the apparatus the travel of the contactors is increased, or with equal travel of the contactors the angle of rotation of the apparatus is increased.

The operation of the cam discs 6, 7 of the contactor groups is effected by shafts 11, 12 to the lower ends of which the cam discs are keyed. The shafts 11, 12 are arranged co-axially in the casing 1, the shaft 12 being hollow and surrounding the shaft 11. The shafts 11, 12 are held against turning in the casing 1 by means of pinch screws 13, 14, and each shaft is provided at its upper end with a friction surface 15, 16 of annular sector shape, said surfaces being of similar dimensions (radius and length of arc, Figs. 4 and 7). Instead of annular sectors the surfaces may be conical sectors or ribbed surfaces. The friction surface 15 belonging to the shaft 11 forms part of a spoke 17 spaced from the shaft and having a hub 18 fixed by means of a key 19 on an end stub 20 of the shaft 11. The outer end of the spoke 17 carries, coaxial to the stub 20 an annular rim 21, Figs. 4 and 7, forming a carrier for a scale drum 22, which is rotatably mounted on the rim 21 and can be fixed thereto by a pinch screw 23. The second friction surface 16 is integral with the shaft 12 and is part of a projection on the upper face of an annular end flange 24 of said shaft. The flange 24 is of diameter equal to that of the rim 21 and also carries a scale drum 25 rotatable on the flange and fixable in desired position thereon by a pinch screw 26. When the shafts 11 and 12 are turned about their common axis, the cam discs 6, 7 and the scale drums 22, 25 turn therewith. This gives, between the scale drums, and a zero index mark 27 on the casing 1, a reading of the angle of turning and consequent radial travel of the contactors 2, 3, from which is derived either the diameter in each of the planes of measurement, or using the difference of the two scale indications, the taper of the conical bore being measured. A friction disc 28 serves to operate both shafts 11, 12, which disc is loosely mounted co-axially with the shafts 11, 12 on the stub 20 of the central shaft 11, and is coupled to the shafts by means of a spring 30 housed in a cavity of a knob-like head 29 integral with the disc 28 which spring 30 presses the disc 28 against the friction surfaces 15, 16 which are in the same plane as the friction surface of the disc 28. When the friction disc 28 is turned by means of its knob 29 on the shaft stub 20, torque will be exerted in equal amounts on the friction surfaces 15, 16 and transmitted thereby the shafts 11, 12. If one of the shafts 11, 12 has its turning obstructed by clamping of the pinching screws 13, 14 or by contact of the shaft actuated measuring contactors 2, 3, then the other shaft 12, 11 can continue to turn by the friction disc 28 until its contactors 3, 2 engage the wall of the bore being measured, the friction disc 28 sliding over the arrested friction surface 15 or 16. The casing 1, which is closed at its lower end by a cap 31, is provided with a short external screw thread 32 on which is mounted a stop ring 33 which may be fixed thereon by a pinching screw 34. The stop ring 33, when the apparatus is in use, bears on the face of the bore being measured, and can be adjusted longitudinally on the casing by means of the screw thread 32 to vary the distance H of the measuring contactors from the beginning of the said bore.

In measuring the diameter of conical bores, it is taken into consideration that the spherical feeling surfaces 4, 105, 106 of the contactors may not always contact the wall of the bore in exactly the same plane of measurement, Fig. 10. The actual diameter g of the bore in the plane of measurement is 2f times greater than the diameter of the outer circle of the feeler surface. This correction dependent on the acute angle β of the cone thus has to be considered when a diameter in a bore of different conicity, or in a cylindrical bore, has to be ascertained. Tables may be compiled giving the correction f for different conicities.

I claim as my invention:

1. Apparatus for measuring and testing bores, internal screw threads and the like comprising a casing, at least two groups of contactors mounted in the casing and of which each group has its contactors in a common axial plane of measurement with a predetermined axial distance between the two groups of contactors, each contactor being mounted for radial movement in said casing, separate means in the casing for actuating each group of contactors, each separate means including means to drive the associated groups of contactors outwardly, coupling means with overload clutches connected to actuate the separate means, and a common manually-operated actuator means in said casing engaging the coupling means to actuate the overload clutches to control the radial movement of the contactors by the separate means, said coupling means actuating the contactors of both groups through the separate means and operative so that the clutch of the contactors of one group will slip after the contactors of that group have reached a surface to be measured so that the other group of contactors will move radially until the contactors of said last-mentioned group have also contacted the surface to be measured, after which both clutches will slip upon further rotation of the actuator means.

2. Apparatus for measuring and testing bores, internal screw threads and the like comprising a casing, at least two groups of contactors mounted in the casing and of which each group has its contactors in a common axial plane of measurement with a predetermined axial distance between the two groups of contactors, each contactor being mounted for radial movement in said casing, separate means in the casing for actuating each group of contactors, each separate means including means to drive the associated groups of contactors outwardly, coupling means with overload clutches connected to actuate the separate means, a common manually-operated actuator means in said casing engaging the coupling means to actuate the overload clutches to control the radial movement of the contactors by the separate means, said coupling means actuating the contactors of both groups through the separate means and operative so that the clutch of the contactors of one group will slip after the contactors of that group have reached a surface to be measured so that the other group of contactors will move radially until the contactors of said last-mentioned group have also contacted the surface to be measured, after which both clutches will slip upon further rotation of the actuator means, and means on the casing for indicating the radial movement of the contactors.

3. Apparatus for measuring and testing bores, internal screw threads and the like comprising a casing, at least two groups of contactors mounted in the casing and of which each group has its contactors in a common axial plane of measurement with a predetermined axial distance between the two groups of contactors, each contactor being mounted for radial movement in said casing, separate means in the casing for actuating each group of contactors, each separate means including means to drive the associated groups of contactors outwardly, coupling means with overload clutches connected to actuate the separate means, and a common manually-operated actuator means in said casing engaging the coupling means to actuate the overload clutches to control the radial movement of the contactors by the separate means, said coupling means actuating the contactors of both groups through the separate means and operative so that the clutch of the contactors of one group will slip after the contactors of that group have reached a surface to be measured so that the other group of contactors will move radially until the contactors of said last-mentioned group have also contacted the surface to be measured, after which both clutches will slip upon further rotation of the actuator means, said actuator means for the contactors comprising operating shafts in the casing concentrically arranged therein with one shaft for each group of contactors.

4. Apparatus for measuring and testing bores, internal screw threads and the like comprising a casing, at least two groups of contactors mounted in the casing and of which each group has its contactors in a common axial plane of measurement with a predetermined axial distance between the two groups of contactors, each contactor being mounted for radial movement in said casing, separate means in the casing for actuating each group of contactors, each separate means including means to drive the associated groups of contactors outwardly, coupling means with overload clutches connected to actuate the separate means, a common manually-operated actuator means in said casing engaging the coupling means to actuate the overload clutches to control the radial movement of the contactors by the separate means, said coupling means actuating the contactors of both groups through the separate means and operative so that the clutch of the contactors of one group will slip after the contactors of that group have reached a surface to be measured so that the other group of contactors will move radially until the contactors of said last-mentioned group have also contacted the surface to be measured, after which both clutches will slip upon further rotation of the actuator means, said actuator means for the contactors comprising operating shafts in the casing concentrically arranged therein with one shaft for each group of contactors, and conical members one on the end of each operating shaft so that each of said conical members will engage the respective group of contactors.

5. Apparatus for measuring and testing bores, internal screw threads and the like comprising a casing, at least two groups of contactors mounted in the casing and of which each group has its contactors in a common axial plane of measurement with a predetermined axial distance between the two groups of contactors, each contactor being mounted for radial movement in said casing, separate means in the casing for actuating each group of contactors, each separate means including means to drive the associated groups of contactors outwardly, coupling means with overload clutches connected to actuate the separate means, a common manually-operated actuator means in said casing engaging the coupling means to actuate the overload clutches to control the radial movement of the contactors by the separate means, said coupling means actuating the contactors of both groups through the separate means and operative so that the clutch of the contactors of one group will slip after the contactors of that group have reached a surface to be measured so that the other group of contactors will move radially until the contactors of said last-mentioned group have also contacted the surface to be measured, after which both clutches will slip upon further rotation of the actuator means, said actuator means for the contactors comprising operating shafts in the casing concentrically arranged therein with one shaft for each group of contactors, and a cam disc on the end of each operating shaft engageable with its respective group of contactors.

6. Apparatus for measuring and testing bores, internal screw threads and the like comprising a casing, at least two groups of contactors mounted in the casing and of which each group has its contactors in a common axial plane of measurement with a predetermined axial distance between the two groups of contactors, each contactor being mounted for radial movement in said casing, separate means in the casing for actuating each group of contactors, each separate means including means to drive the associated groups of contactors outwardly, coupling means with overload clutches connected to actuate the separate means, a common manually-operated actuator means in said casing engaging the coupling means to actuate the overload clutches to control the radial movement of the contactors by the separate means, said coupling means actuating the contactors of both groups through the separate means and operative so that the clutch of the contactors of one group will slip after the contactors of that group have reached a surface to be measured so that the other group of contactors will move radially until the contactors of said last-mentioned group have also contacted the surface to be measured, after which both clutches will slip upon further rotation of the actuator means, said actuator means for the contactors comprising operating shafts in the casing concentrically arranged therein with one shaft for each group of contactors, and means on the casing for determining the axial travel of said shafts in the casing.

7. Apparatus for measuring and testing bores, internal screw threads and the like comprising a casing, at least two groups of contactors mounted in the casing and of which each group has its contactors in a common axial plane of measurement with a predetermined axial distance between the two groups of contactors, each contactor being mounted for radial movement in said casing, separate means in the casing for actuating each group of contactors, each separate means including means to drive the associated groups of contactors outwardly, coupling means with overload clutches connected to actuate the separate means, and a common manually-operated actuator means in said casing engaging the coupling means to actuate the overload clutches to control the radial movement of the contactors by the separate means, said coupling means actuating the contactors of both groups through the separate means and operative so that the clutch of the contactors of one group will slip after the contactors of that group have reached a surface to be measured so that the other group of contactors will move radially until the contactors of said last-mentioned group have also contacted the surface to be measured, after which both clutches will slip upon further rotation of the actuator means, said actuator means for the contactors comprising operating shafts in the casing concentrically arranged therein with one shaft for each group of contactors, and the common coupling and turning means for the shafts mounted by means of a bushing which is free to turn on the free end of one of the shafts.

8. Apparatus for measuring and testing bores, internal screw threads and the like comprising a casing, at least two groups of contactors mounted in the casing and of which each group has its contactors in a common axial plane of measurement with a predetermined axial distance between the two groups of contactors, each contactor being mounted for radial movement in said casing, separate means in the casing for actuating each group of contactors, each separate means including means to drive the associated groups of contactors outwardly, coupling means with overload clutches connected to actuate the separate means, a common manually-operated actuator means in said casing engaging the coupling means to actuate the overload clutches to control the radial movement of the contactors by the separate means, said coupling means actuating the contactors of both groups through the separate means and operative so that the clutch of the contactors of one group will slip after the contactors of that group have reached a surface to be measured so that the other group of contactors will move radially until the contactors of said last-mentioned group have also contacted the surface to be measured, after which both clutches will slip upon further rotation of the actuator means, and a stop ring adjustably mounted on the casing to be movable thereon for determining the depth of penetration of the apparatus in the bore being measured.

References Cited in the file of this patent

UNITED STATES PATENTS 2,591,452     Maag _____ Apr. 1, 1952

FOREIGN PATENTS 138,903     Sweden _____ Jan. 27, 1953